(12) United States Patent
Laroia et al.

(10) Patent No.: US 7,027,429 B2
(45) Date of Patent: Apr. 11, 2006

(54) METHOD AND APPARATUS FOR TIME AND FREQUENCY SYNCHRONIZATION OF OFDM COMMUNICATION SYSTEMS

(75) Inventors: Rajiv Laroia, Basking Ridge, NJ (US); Junyi Li, Bedminster, NJ (US); Sundeep Rangan, Hoboken, NJ (US); Hemanth T. Sampath, Bethesda, MD (US)

(73) Assignee: Flarion Technologies, Inc., Bedminster, NJ (US)

( * ) Notice: Subject to any disclaimer, the term of this patent is extended or adjusted under 35 U.S.C. 154(b) by 877 days.

(21) Appl. No.: 09/884,581

(22) Filed: Jun. 19, 2001

(65) Prior Publication Data

US 2002/0196731 A1  Dec. 26, 2002

(51) Int. Cl.
*H04J 3/06* (2006.01)
(52) U.S. Cl. ............... 370/350; 370/503; 375/260; 375/316
(58) Field of Classification Search ........... 370/210, 370/503, 350; 375/260, 316
See application file for complete search history.

(56) References Cited

U.S. PATENT DOCUMENTS

| 5,732,113 | A | * | 3/1998 | Schmidl et al. | 375/355 |
| 6,021,110 | A | * | 2/2000 | McGibney | 370/208 |
| 6,487,252 | B1 | * | 11/2002 | Kleider et al. | 375/260 |
| 6,654,429 | B1 | * | 11/2003 | Li | 375/316 |

* cited by examiner

*Primary Examiner*—Ricky Ngo
*Assistant Examiner*—Richard Chang
(74) *Attorney, Agent, or Firm*—Straub & Pokotylo; Michael P. Straub

(57) ABSTRACT

A method and apparatus for joint time and frequency synchronization for orthogonal frequency division multiplexing (OFDM) systems. A multitone pilot signal is sent in a designated OFDM symbol period. The receiver synchronizes to the pilot signal in a two-stage procedure. The first stage estimates the frequency offset coarsely with a frequency-domain correlation method and estimates the time offset with smoothed time-domain correlation. In a multi-path channel, the smoothed time offset estimate is used to locate a cyclic prefix interval which captures the maximum total signal energy. The second stage improves the frequency estimate with a computationally efficient numerical optimization method.

28 Claims, 11 Drawing Sheets

METHOD AND APPARATUS FOR TIME AND FREQUENCY SYNCHRONIZATION OF OFDM COMMUNICATION SYSTEMS

FIELD OF THE INVENTION

This invention relates to communication systems utilizing orthogonal frequency division multiplexing (OFDM).

BACKGROUND OF THE INVENTION

Orthogonal frequency division multiplexing (OFDM) is a widely-used technique for wireless and other types of communications. In OFDM, data is transmitted in parallel over multiple equally spaced carrier frequencies using Fourier transform methods for modulation and demodulation. By inserting a guard period or guard interval, referred to as a cyclic prefix, between symbols, data on OFDM subcarriers can be received orthogonally with no inter-carrier interference (ICI) and no intersymbol interference (ISI). Eliminating the ICI and ISI mitigates the effects of delay spread, making OFDM well-suited to wireless multipath channels. Moreover, for wireless channels, OFDM can be used with coding to easily exploit frequency diversity and combat Rayleigh fading to improve reliable information transfer.

It is well-known that OFDM systems demand strict timing and frequency synchronization between the transmitter and receiver. To avoid intersymbol interference (ISI), the receiver must adjust its symbol timing so that the symbol transitions occur within the cyclic prefixes between the symbols. In a multipath channel, the cyclic prefix must contain the symbol transitions under all signal paths. Also, being a multicarrier system, the OFDM receiver and transmitter need to be tightly frequency synchronized in order to avoid intercarrier interference (ICI).

Several methods have been proposed for OFDM time and frequency synchronization. Blind algorithms known in the art generally do not use any pilot training signals and typically exploit the correlation of the OFDM cyclic prefix for synchronization. While blind methods are generally not wasteful of bandwidth on synchronization pilots, the synchronization accuracy is typically not as good as that attained using pilot-assisted methods. Other known systems utilize pilot-assisted synchronization methods based on a number of different pilot synchronization signals.

SUMMARY OF THE INVENTION

In the present invention, the receiver performs the time and frequency synchronization using a multitone pilot synchronization signal transmitted in a designated OFDM symbol period. The multitone pilot signal consists of discrete tones whose tone frequencies and tone coefficients are a priority known to the receiver.

The synchronization from the multitone signal is preferably performed in two stages. The first stage uses a coarse frequency discretization using F candidate frequency offset estimates. For each candidate frequency offset, a smoothed time-domain correlation (TDC) estimation procedure is used to estimate the pilot signal's time offset and received signal energy. The procedure yields F candidate time-frequency offset estimate pairs, and the time-frequency estimate corresponding to the largest detected energy is selected.

After the first stage is completed, the frequency offset estimate is refined in a second stage by a numerical optimization procedure. The time estimate from the first stage and the optimization procedure of the second stage finds the frequency offset at which the correlation between the received signal and the pilot signal is maximized. A computationally efficient method for performing the optimization, described herein, may be utilized.

An alternate, simpler implementation of the first stage may also be utilized. In such an implementation, the frequency candidates are assumed to be integer multiples of a certain basic frequency. Under this assumption, an estimate of the frequency with the maximum energy can be selected using a frequency domain correlation method. After the frequency has been estimated, the time offset is estimated by a smoothed TDC estimation as before.

In both implementations of the first stage, the TDC correlation can be implemented with standard Fast Fourier Transform (FFT) methods for computational efficiency. The first implementation requires one FFT of the received data plus one FFT for each of the F TDC estimators for a total of F+1 FFTs. The simplified implementation requires only two FFTs.

BRIEF DESCRIPTION OF THE DRAWINGS

In the drawing figures, which are not to scale, and which are merely illustrative, and wherein like reference characters denote similar elements throughout the several views.

DETAILED DESCRIPTION OF THE PREFERRED EMBODIMENTS

Other objects and features of the present invention will become apparent from the following detailed description, considered in conjunction with the accompanying drawing figures.

Problem Definition

Figure 1:
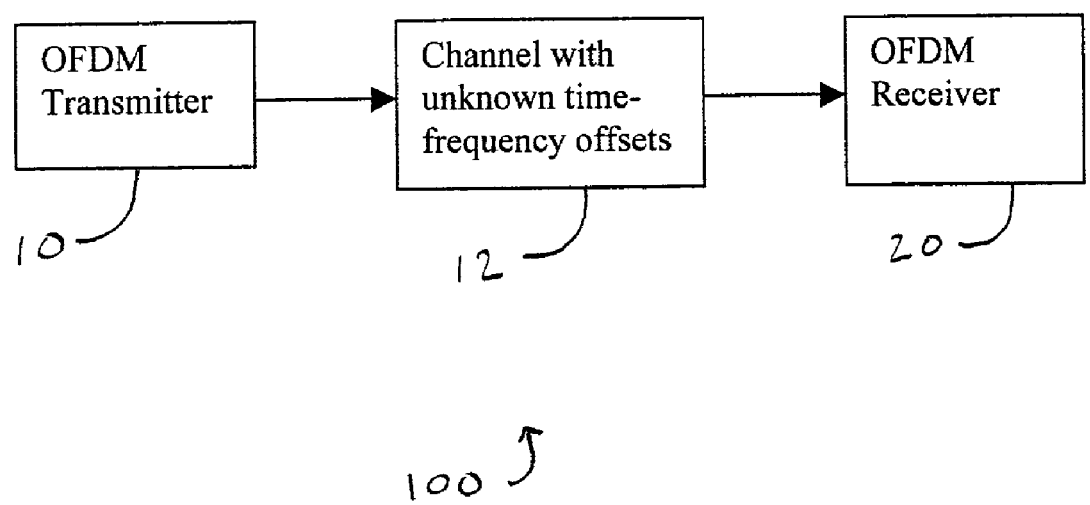
FIG. 1 is a block diagram of a system of a type utilizing the present invention.

With initial reference FIG. 1, there is illustrated an OFDM system 10 of a type utilizing the present invention. A transmitter 10 and receiver 20 are linked over a channel 12 that imparts an unknown time and frequency offset on a transmitted OFDM signal. Synchronization is the process where the receiver estimates these time and frequency offsets.

Figure 2:
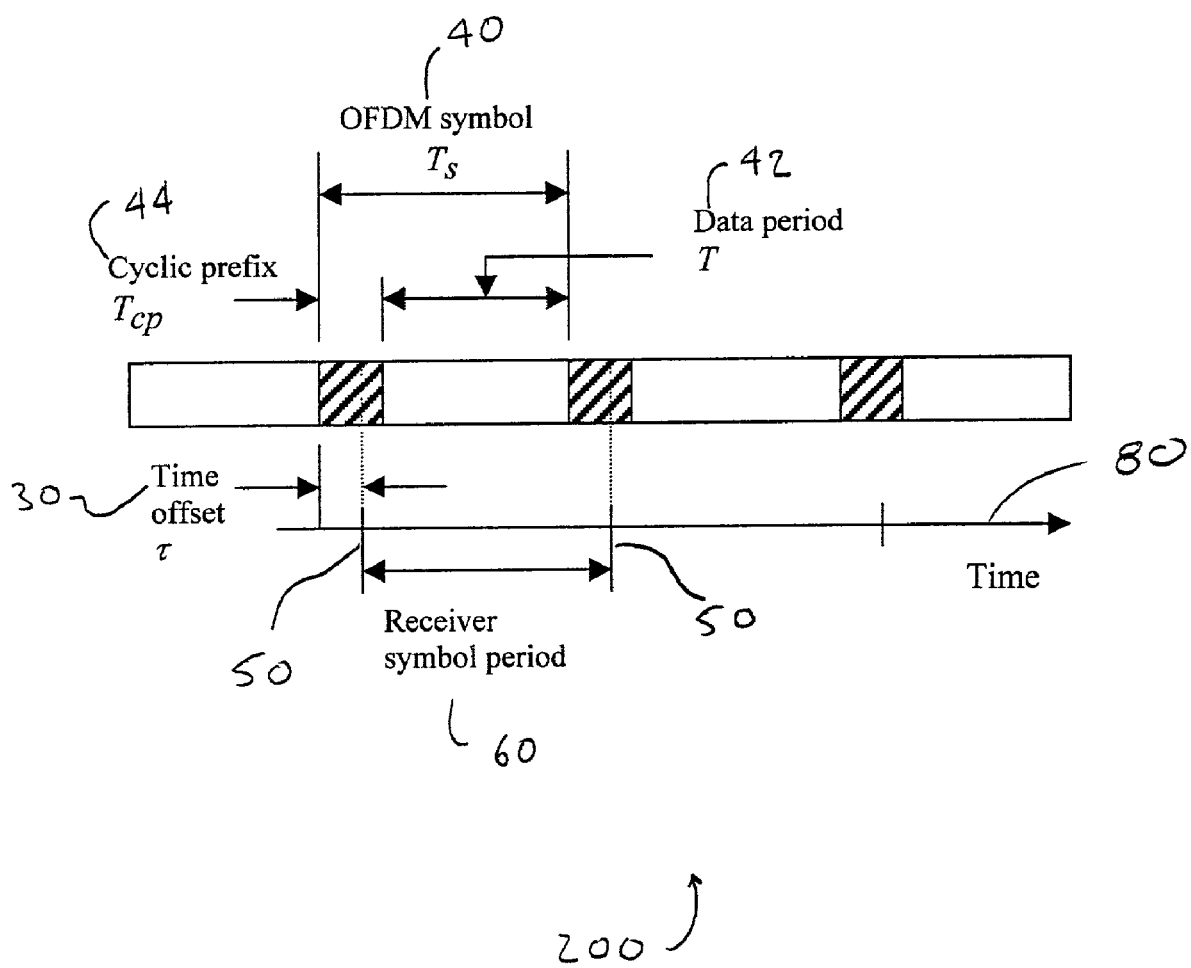
FIG. 2 is an illustrative representation of a general OFDM signal.

FIG. 2 illustrates a general OFDM signal 200 arriving with an offset 30 from the receiver timing. An OFDM signal is a sequence of symbols 40 of duration $T_s$. Each symbol period contains a data period 42 of duration T, and a cyclic prefix period 44 of duration $T_{cp}$. Data is transmitted during the data period 42, while the cyclic prefix 44 acts a guard interval between symbols.

The marks 50 on the time axis 80 of FIG. 2 represent the beginnings of the OFDM symbol periods as measured at the receiver 20. As shown in FIG. 2, the OFDM signal 40 arrives with a time offset 30, τ, relative to the receiver symbol timing. Thus it can be seen that the OFDM symbol 40 and receiver symbol period 60 do not begin at the same time. For proper reception, the time offset 30 must be less than the cyclic prefix length 44, i.e. $0 \leq \tau < T_{cp}$.

Figure 3:
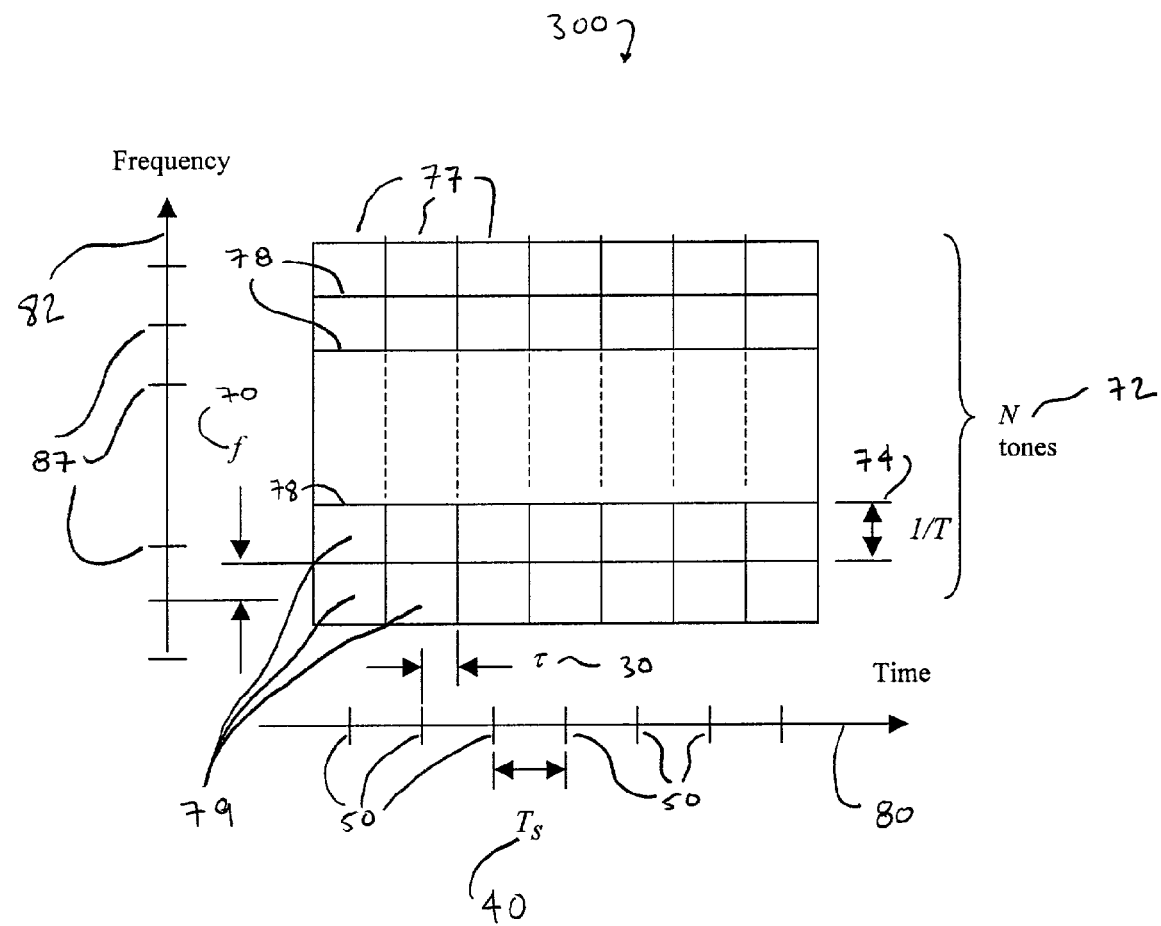
FIG. 3 is an illustrative representation of an OFDM signal being received with both time and frequency offsets.

Referring now to FIG. 3, there is illustrated an OFDM signal 300 being received with both time offsets 30 and frequency offsets 70. In OFDM, the data period of each symbol is a linear combination of N tones 72 spaced in frequency with uniform spacing 74, shown as 1/T. The OFDM signal 300 is thus represented in FIG. 3 as a time-frequency grid, with each column 77 representing the time interval for one OFDM symbol 79, and each horizontal line 78 representing the frequency location of one of the tones. Data is transmitted in the OFDM signal 300 by modulating the tones 72 in the OFDM symbols. An OFDM signal with N tones can transmit N complex values per OFDM symbol.

The time axis 80 of FIG. 3 is marked at the points 50 where the receiver 20 begins the samples for each OFDM symbol 79. The frequency axis 82 is marked at the frequencies 87 where the receiver 20 samples the tones 72. As shown in FIG. 3, the OFDM signal 300 arrives with a time offset 30, τ, and frequency offset 70, f, relative to the receiver sampling. For proper reception, the frequency offset 70, f, must be much smaller than the tone spacing 1/T (74); and, as stated earlier in connection with FIG. 2, the time offset 30, τ, must be smaller than the cyclic prefix length 44, $T_{cp}$. The purpose of synchronization, as further described below, is to estimate these time and frequency offsets to enable the receiver to align its sampling with the received signal.

Multitone Synchronization

Figure 4:
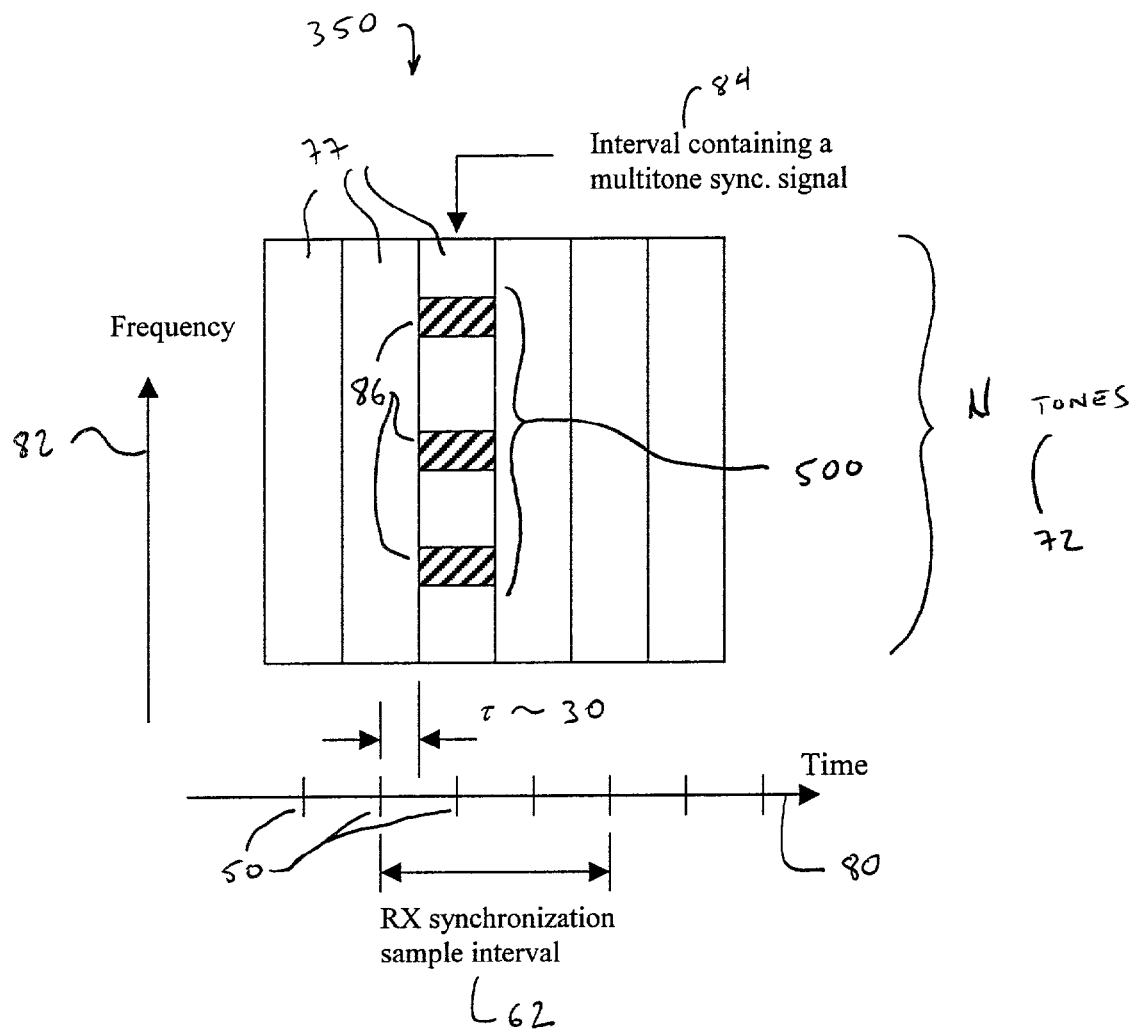
FIG. 4 is an illustrative representation of an OFDM signal with multitone synchronization signals.

With reference to FIGS. 1 through 4, FIG. 4 illustrates the transmission and reception of the preferred multitone synchronization signals of the present invention. In order for the receiver 20 to synchronize to the transmitter 10, the transmitter 10 sends a certain multitone synchronization signal 500 as part of overall signal 350. A multitone synchronization signal 500 is a signal transmitted in a time interval 84 preferably having the duration of a single OFDM symbol period 77 on some subset of the N tones 72. Using the number S to denote the number of tones in the multitone synchronization signal 500, and for each s-th tone, s=1, . . . , S, then $n_s$ will denote a tone frequency index, and $U_s$ will denote the complex value transmitted on the tone. FIG. 4 shows the time-frequency placement of an exemplary multitone synchronization signal 500. In FIG. 4, the signal 500 has S=3 tones, whose frequency locations are indicated by the hatched areas 86.

It can be seen from the above that to conduct synchronization, the receiver should sample the overall signal 350 in a time interval containing the multitone synchronization signal 500. This synchronization sample interval 62 must be sufficiently large as to fully contain the synchronization signal 500 for all possible timing offsets 30, τ. Consequently, the receiver preferably has some a priori bound on a maximum time offset. This bound can be found from some previous, coarser synchronization using any preferred, art recognized technique, as a matter of design choice. In the case of a multipath channel, for example, the sample interval 62 should be sufficiently large as to contain all possible received copies of the signal 350.

Two-Stage Synchronization

Figure 5:
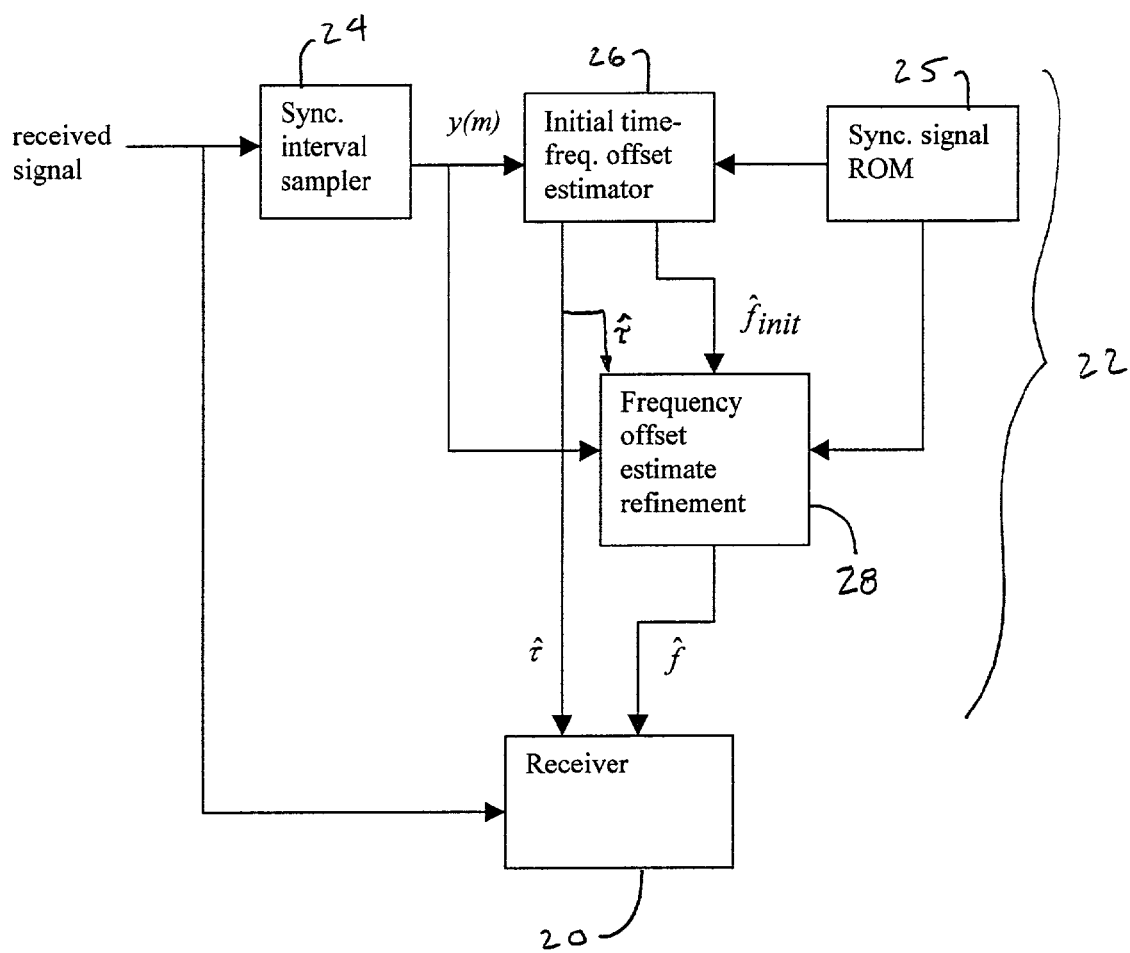
FIG. 5 is a block diagrammatic representation of a two-stage synchronization system and receiver in accordance with a preferred embodiment of the present invention.

With continuing reference to FIGS. 1 through 4, and referring also to FIG. 5, there is illustrated a proposed two-stage system 22 for synchronizing the receiver 20 from the data captured in the synchronization sample interval discussed above. The system 22 is preferably configured to reside at or proximate the receiver 20. The system could be implemented in a microprocessor, general purpose computer, digital signal processor, other art-recognized platform, or some combination of the aforementioned.

In the system of the present invention, a synchronization interval sampler 24 first extracts and samples the component of the signal from the synchronization sample interval. As is known in the art of OFDM processing, the sampler 24 preferably uses a sample period of T/N. The sequence of baseband, complex samples are denoted by y(m), m=0, . . . , $M_y$–1, where $M_y$ denotes the total number of samples in the synchronization sample interval. The synchronization system 22 also has stored therein the values of a reference multitone synchronization signal in a read-only memory (ROM) 25. The reference synchronization signal can be stored in either the time or frequency domain format, as will be further discussed herein.

After capturing the data from the synchronization interval 62, as discussed above, time and frequency offsets are estimated by locating the multitone signal 500 within the captured data. For preferred computational reasons, the time and frequency offset estimation is performed in two stages. An initial time-frequency offset estimator 26 yields a time offset estimate $\hat{\tau}$ and an initial frequency offset estimate $\hat{f}_{init}$. As will be explained further hereinbelow, the initial estimation is performed by a discrete search over a finite set of frequency candidates. Consequently, the frequency estimate may initially not be as accurate as may be desired. To improve the frequency offset estimate, a frequency offset refinement block 28 performs a certain numerical optimization procedure yielding an improved frequency offset estimate denoted $\hat{f}$. The time and frequency offset estimates, $\hat{\tau}$ and $\hat{f}$, from the aforementioned two stages, are used by the receiver 20 to synchronize to the received signal and perform the regular, art-recognized receiver tasks.

Initial Time and Frequency Offset Estimation

Figure 6:
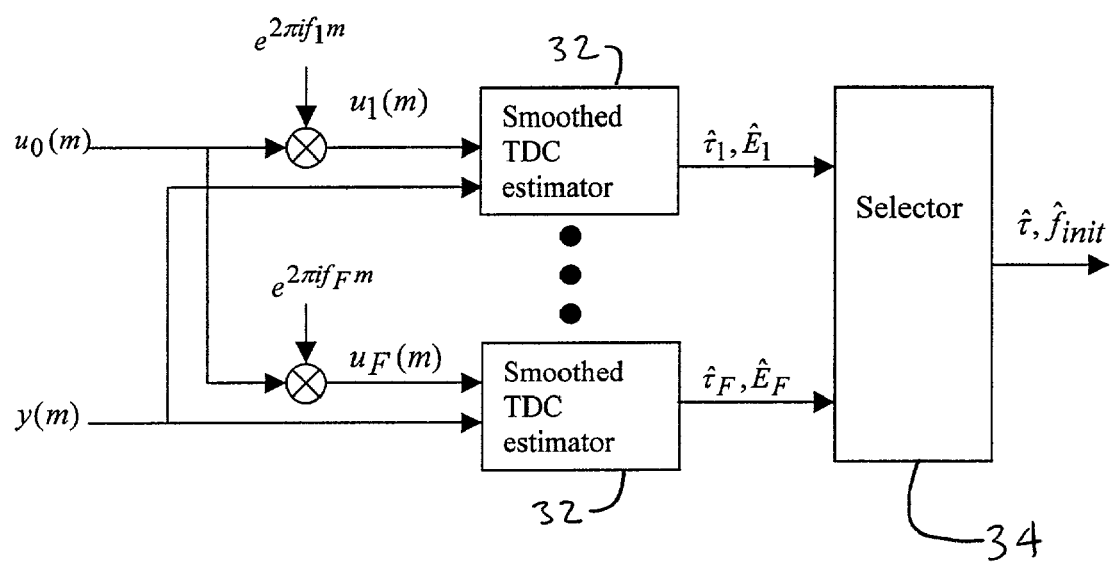
FIG. 6 is a block diagrammatic representation of a system implementing a preferred initial time and frequency offset estimator.

Turning now to FIG. 6, there is depicted a block diagram of a system implementing the proposed initial time and frequency offset estimation performed by estimator 26. Generally, the initial estimation is preferably obtained by conducting a discrete search over a pre-selected set of candidate frequency offsets, $\hat{f}_1, \ldots, \hat{f}_F$. As discussed in greater detail below, the candidate frequency offsets can be taken from the range of possible frequency offsets. For each candidate frequency offset, $\hat{f}_i$, an initial estimator searches the received signal samples, y(m), for a frequency shifted version of the multitone synchronization signal, $u_0(m)$. This search yields estimates of the pilot signal energy, $\hat{E}_i$, and pilot signal time offset, $\hat{\tau}_i$, corresponding to the candidate frequency offset estimates, $\hat{f}_i$. The initial estimator then selects the time and frequency offset estimate pair, $(\hat{\tau}_i, \hat{f}_i)$, corresponding to the largest detected energy, $\hat{E}_i$.

The input y(m) is the sequence of time-domain samples from the synchronization interval sampler 24 in FIG. 5. The input $u_0(m)$ is the sequence of time-domain samples of the reference multitone synchronization signal, which can be loaded from ROM 25. Similar to y(m), the samples for $u_0(m)$ are preferably taken with the standard OFDM sampling period of T/N. If the multitone signal has S tones at frequency indices $n_s$ with complex values $U_s$, the samples are given by $$u_0(m) = \sum_{s=1}^{S} U_s e^{2\pi i m n_s/N}, m = 0 \ldots, M_u - 1,$$

where $M_U = \lceil NT_s/T \rceil$ is the number of samples to cover one $T_s$-length OFDM symbol period.

The reference multitone signal $u_0(m)$ is multiplied by the exponentials, $e^{2\pi i f_i Tm/N}$, to create frequency shifted reference signals, $u_i(m)$, $i=1, \ldots, F$.

The time-domain correlation (TDC) estimators 32 then search for the frequency-shifted reference signals, $u_i(m)$, within the received signal, y(m). The search is performed via a smoothed time-domain correlation estimate that will be explained below. For each candidate frequency offset estimate $\hat{f}_i$, the smoothed TDC 32 yields: $\hat{\tau}_i$, an estimate of the time offset of the frequency shifted signal, $u_i(m)$, within the received signal, y(m); and $\hat{E}_i$, an estimate of the reference signal energy, within the received signal.

After performing the smoothed TDC estimates, the selector block 34 selects the estimate from the F candidate time-frequency offset estimates, $(\hat{\tau}_i, \hat{f}_i)$, $i=1, \ldots, F$ corresponding to the maximum detected energy, $\hat{E}_i$.

Smoothed Time Domain Correlation Estimation for Multipath Channels

Figure 7:
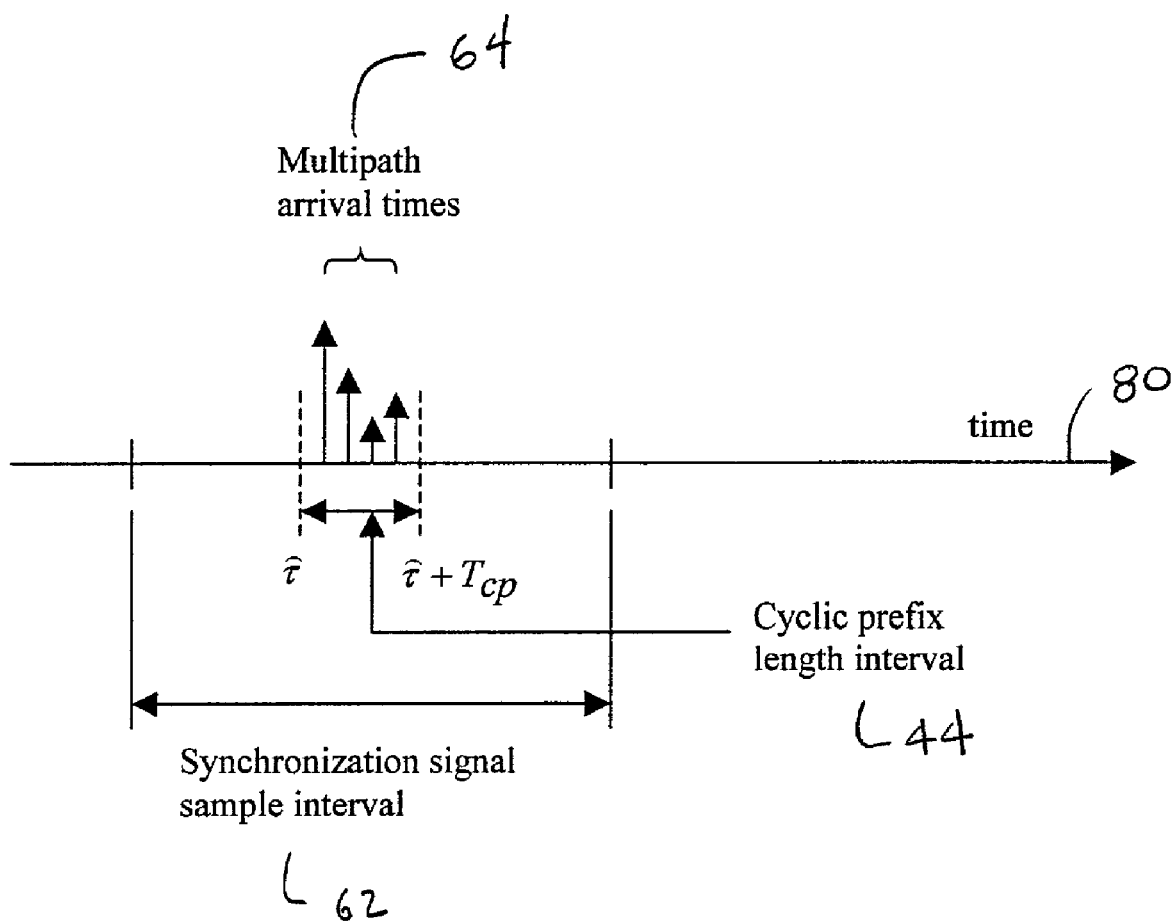
FIG. 7 is an illustrative representation of multipath signal reception and the relative energies of received signals at various arrival times.

With reference to FIGS. 1 through 7, FIG. 7 illustrates an exemplary timing estimation problem for a multipath channel. In OFDM transmission, it is known that certain channels may be multipath, meaning that signals from the transmitter can arrive at the receiver via several different physical routes. In the synchronization system of the present invention, multipath channels result in the receiver 20 receiving several copies of the multitone synchronization signal 500, each copy arriving at a different time. FIG. 7 illustrates an exemplary multipath delay profile. The figure shows a number of multipath arrival times 64 of the multitone synchronization signal 500 within the synchronization sample interval 62, each arrival time being indicated by a vertical arrow. The height of the arrows indicate the relative energy of the copies arriving at each time.

Figure 8:
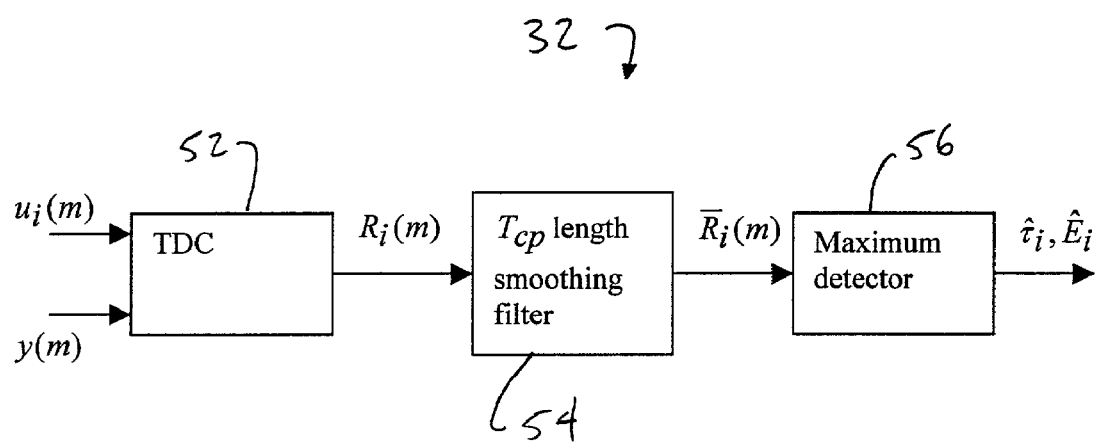
FIG. 8 is a block diagrammatic representation of a preferred smoothed time domain correlation estimator.

Referring now to FIG. 8, in the system of the present invention, each of TDC estimators 32 comprises three functional blocks. The first block is a standard time-domain correlation (TDC) block 52 and computes $R_i(m)$, the cross-correlation between $u_i(m)$ and the received signal. The cross-correlation magnitude, $|R_i(m)|$, is a standard estimate of the energy of the reference synchronization signal, ui(m), received at a time offset of m samples. The cross-correlation $R_i(m)$ can be computed by standard FFT methods.

The second block, the smoothing filter 54, computes $\bar{R}_i(m)$, the sum of the cross-correlation magnitudes, $|R_i(l)|$, in a $T_{cp}$-length interval beginning at a time offset of m samples. This summation can be computed with a standard finite impulse response (FIR) filter on the input $|R_i(l)|$.

The final block, the maximum detector 56, computes, $\hat{E}_i$, the maximum value of the filtered output, $\bar{R}_i(m)$, and $\hat{\tau}_i$, the time corresponding to the sample m at which $\bar{R}_i(m)$ is maximized.

Now, since $|R_i(m)|$ represents an estimate of the energy of the reference synchronization signal, $u_i(m)$, received at a time offset of m samples, the filtered cross-correlation, $\bar{R}_i(m)$, represents an estimate of the total energy in a $T_{cp}$-length interval at a time offset of m samples. Therefore, the maximum detector 56 output, $\hat{\tau}_i$ is an estimate of the time $\tau$ at which the energy of the reference signal received in the time interval $|\tau, \tau+T_{cp}|$ is maximized. The output $\hat{E}_i$ is an estimate of the total received energy.

Simplified Initial Time and Frequency Offset Estimation

Figure 9:
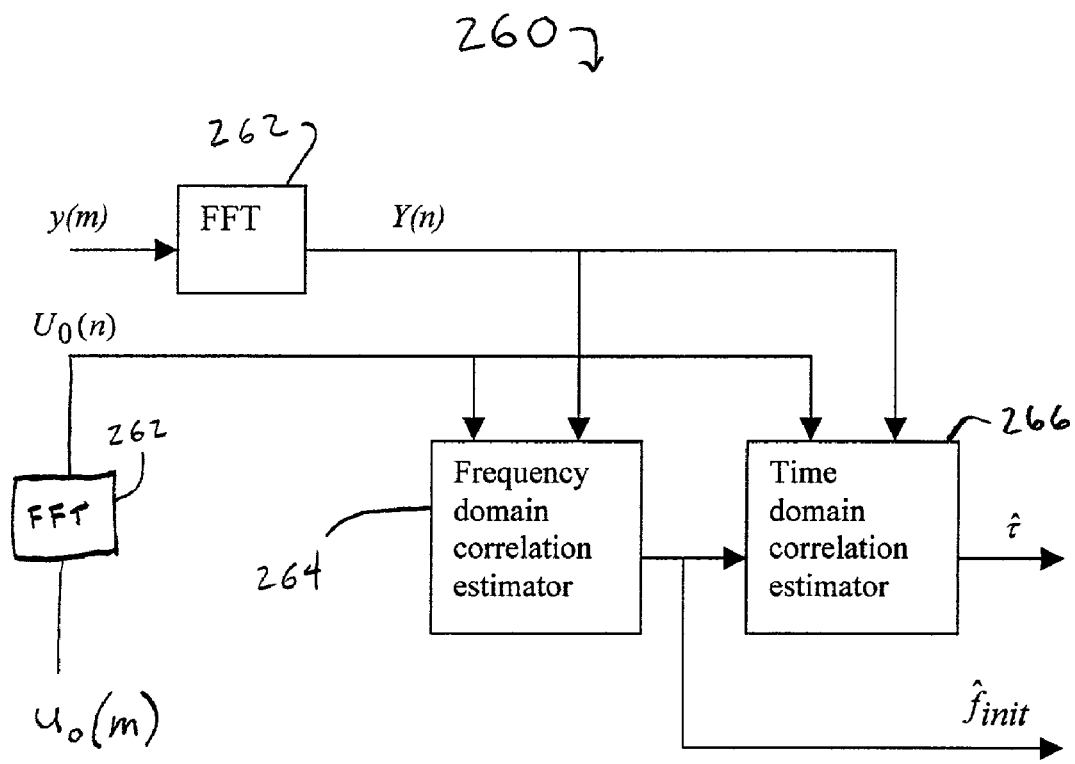
FIG. 9 is a block diagrammatic representation of an alternate embodiment of an initial time and frequency offset estimator.

FIG. 9 is a block diagram of an alternative, simpler embodiment of an initial time and frequency offset estimator 260. The initial time and frequency estimator 26 in FIG. 6 requires more computing overhead than estimator 260. Specifically estimator 26 requires F smoothed TDC estimators, and each TDC requires an M-point FFT followed by a smoothing operation. Therefore, performing the procedure could be beyond the computational resources of certain receivers if F is large. The number, F, of candidate frequency offsets to test needs to be large when an accurate estimate is required or the initial frequency range is large.

The system in FIG. 9 provides an alternative, computationally simpler method for obtaining initial estimates, $\hat{\tau}$ and $\hat{f}_{init}$, of the time and frequency offsets of the multitone signal $u_0(m)$ in the received signal y(m). The basis of this simplified estimator is to first obtain a frequency offset estimate, $\hat{f}_{init}$, and then use the frequency offset estimate to obtain a time offset estimate, $\hat{\tau}$.

For the frequency offset estimate, the system in FIG. 9 first computes Y(n), by performing an FFT of the received signal y(m) in FFT block 262. The system also uses an FFT of the multitone reference signal $u_0(m)$. This output of FFT block 262 is denoted $U_0(n)$, but this value can also preferably be pre-computed and loaded from the synchronization signal ROM 25 in FIG. 5 (not shown).

With the FFTs computed, the frequency offset is easily estimated by finding frequency offset at which the reference multitone signal and the received signal are maximally correlated. To this end, a frequency-domain correlation estimator 264 sets the frequency estimate by the formula: $\hat{f}_{init}=k\Delta f$, where $\Delta f$ is the FFT tone spacing, and k is the offset at which $U_0(n+k)$ and Y(n) are maximally correlated.

After determining a frequency offset estimate $\hat{f}_{init}$, the time offset, $\hat{\tau}$, can be estimated as before. That is, the reference signal can be shifted by the frequency offset estimate $\hat{f}_{init}$, and then a smoothed TDC 266 can be used to estimate the time offset of the frequency shifted reference signal within the received signal. As before, the time estimation can be performed with the FFTs $U_0(n)$ and Y(n).

Frequency Offset Estimation Refinement

Figure 10:
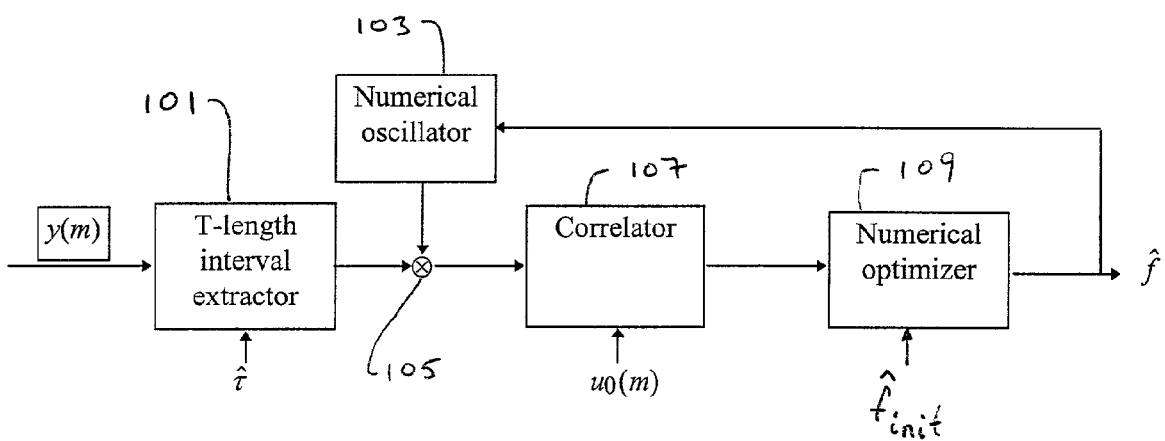
FIG. 10 is a block diagrammatic representation of a preferred frequency offset estimate refinement block.

FIG. 10 shows a block diagram of a possible implementation of the "frequency offset estimate refinement" block in FIG. 5.

The first block 101, the T-length interval extractor has two inputs: y(m), a sequence of received synchronization samples, and $\hat{\tau}$, a time estimate. The output of this block consists of a subset of the y(m) sequence, which is defined as follows. The starting point of the subset sequence is $\tau$ away from the beginning of y(m) sequence. The length of the subset is equal to the interval of uO(m), the reference multitone signal.

The second block 103, the numerical oscillator, generates a sequence of complex samples $e^{2\pi \hat{f}m}$, (which is similar to what is shown in FIG. 6).

The output sequences of the first and the second blocks are multiplied by multiplier 105 and the result is a sequence to be inputted to the third block 107, the correlator. The other input of this block is the reference sample sequence u0(m). The correlator block outputs the correlation of the two input sequences.

The last block 109, the numerical optimizer, takes the correlation input and adjusts the frequency estimate $\hat{f}$. Standard numerical optimization procedures can be used in this block. The adjusted frequency estimate is fed back to the second block, and the above procedure repeats.

More specifically, the frequency offset estimate, $\hat{f}_{init}$, from the initial time and frequency offset estimation may not in all circumstances be sufficiently accurate for the chosen application. As described above, the initial estimator is based on testing discrete frequency offset candidates. In order that the computation in the initial estimation is not overwhelming, the number of frequency offset candidates, F, must be kept small. Also, in the simplified estimator, the frequency can be estimated only within the FFT tone spacing. Consequently, a more accurate estimate of the frequency offset may be needed after the initial estimation has been performed.

The system in FIG. 10 can be used to find a more accurate frequency offset estimate. The input y(m) to the system is the time-domain samples of the received signal, and $u_0(m)$ is the reference multitone signal described previously. The system first uses the time offset estimate, $\hat{\tau}$, computed in the T-length interval extractor 101 initial estimation stage, to extract a T-length sample of y(m) containing the reference multitone signal.

A numerical oscillator 103 generates a complex exponential of a candidate frequency offset, $\hat{f}$. The T-length sample of the received signal y(m) is then multiplied in multiplier 105 by the oscillator output, frequency shifting the received signal by $\hat{f}$. The frequency-shifted received signal is then correlated in correlator 107 against the reference multitone signal $u_0(m)$. This correlation can be performed by standard FFT methods. In particular, if $u_0(m)$ is a multitone signal with S tones, the correlation can be computed from the corresponding S FFT outputs.

In principle, the true frequency offset is the frequency at which the correlation is maximized. A numerical optimization block 109 recursively tests different frequency offsets $\hat{f}$ and selects the frequency offset which maximizes the correlation. The optimization can be conducted with standard numerical optimization procedures using the frequency offset estimate $\hat{f}_{init}$ from the initial time and frequency offset estimation as a starting point.

Application to OFDM Systems with Channel Estimation Pilot Signals

Figure 11:
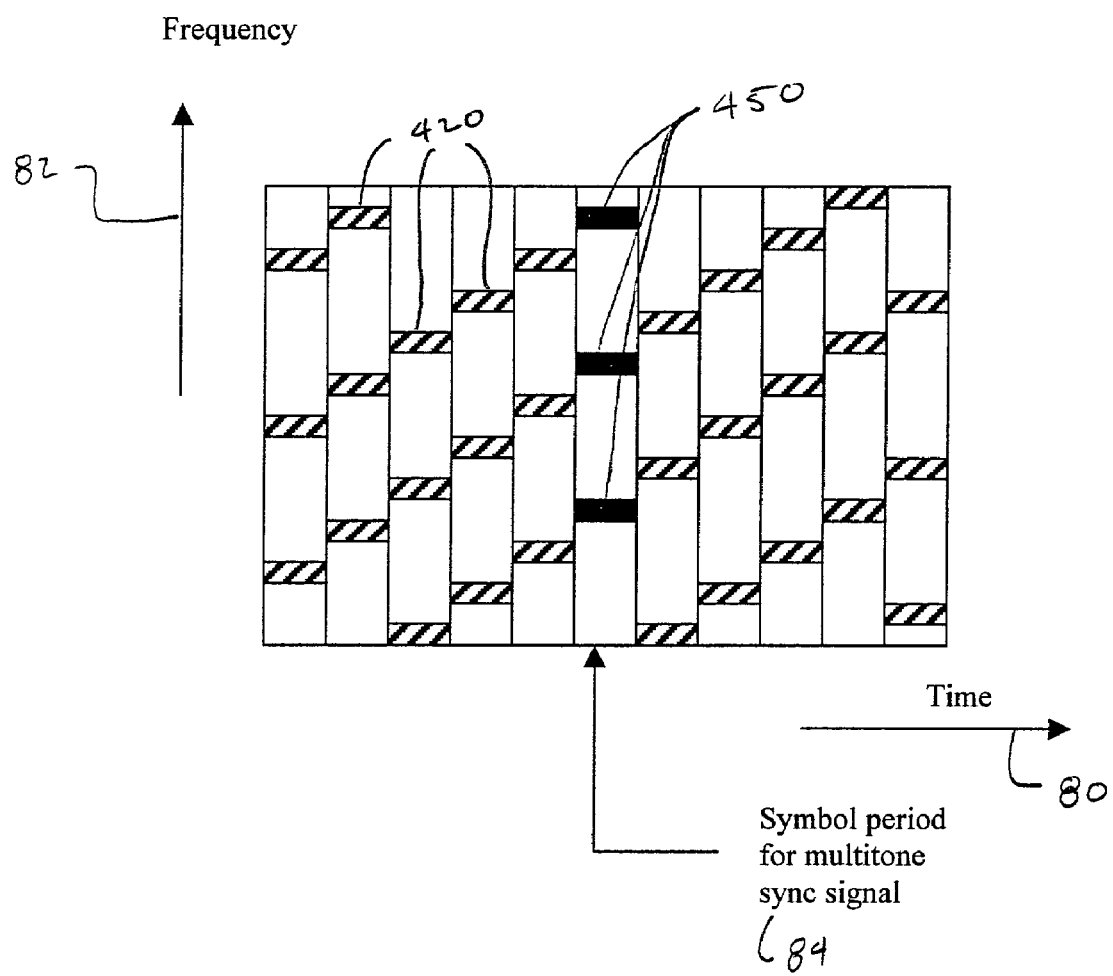
FIG. 11 is an exemplary representation of a multitone synchronization signal from an OFDM channel estimation pilot signal.

FIG. 11 shows an exemplary construction of a multitone synchronization signal from an OFDM channel estimation pilot signal. In certain OFDM systems, the transmitter sends a well-known pilot, or reference, signal from which any receiver can estimate the channel and coherently demodulate the data. The OFDM channel estimation pilot signal is typically sent on some designated subset of the tones in designated OFDM symbol periods. In a given OFDM symbol period, the tones used for the channel estimation pilot signal are called "channel estimation pilot tones", or simply "pilot tones". The remaining non-pilot tones are used for data transmission to the receivers. FIG. 11 shows an example distribution of channel estimation pilot tones in the time-frequency grid. The pilot tones are indicated by the hatched regions 420.

In OFDM systems with channel estimation pilot signals, the channel estimation pilot signal can also be used for timing and frequency synchronization. To this end, a receiver first coarsely synchronizes to the channel estimation pilot signal, approximately locating it in time and frequency. The receiver then selects one of the OFDM symbols and uses the channel estimation pilot tones within the symbol as a multitone synchronization signal. In the example depicted in FIG. 11, the pilot tones selected for use as synchronization tones are indicated by the solid intervals 450. Any OFDM symbol containing channel estimation pilot tones can be used. The receiver can then follow the teachings herein described above and estimate the time and frequency offsets accurately from the multitone synchronization signal. In this way, the receiver can obtain synchronization without having the transmitter send any pilots in addition to the pilot used for channel estimation.

Thus the instant invention offers benefits over prior art systems. For example, the multitone signals are a well suited choice for OFDM synchronization pilots, since they can be transmitted on tones distinct from the data tones so that they do not interfere with the regular data transmission. Also, many existing or proposed OFDM systems periodically transmit multitone signals as channel estimation pilots in manners known in the art. These multitone channel estimation pilots could also be used for the purpose of timing and frequency synchronization. In the prior art, it was necessary to transmit the synchronization pilot signals in addition to the channel estimation pilots.

Thus, as has been set forth above, one feature of the present invention is that the time and frequency synchronization can be performed jointly in a computationally efficient manner. Specifically, the computational load is reduced by using a two-stage procedure of coarse estimation followed by frequency estimate refinement. Also, in the proposed simplified implementation search method, the frequency offset is estimated before the time offset and the joint two-dimensional search is avoided.

Additionally, the timing synchronization method is well-suited to multipath channels. The smoothed TDC estimator presented herein locates a cyclic prefix length interval which captures the maximum received signal energy. The location of the interval is estimated without estimating the individual path's locations.

The system and methods taught herein can be utilized in a wide variety of communications systems, whether over wired, wireless, ultrasonic, optical, laser or other art recognized channels or media, including underwater. The system may be implemented as discrete components, integrated components, application specific integrated circuits, in software, hardware or firmware, in a digital signal processor, microprocessor, or as a combination of one or more of the aforementioned implementation methodologies, or otherwise, as a matter of design choice.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. An orthogonal frequency division multiplexing (OFDM) communication device, comprising:
  an OFDM receiver for receiving an OFDM signal containing a multitone synchronization signal;
  a synchronization interval sampler coupled to said receiver;
  an initial time and frequency offset estimator connected to said sampler and said receiver; and
  a frequency offset estimate refinement unit connected to said receiver, said sampler and said receiver,
  wherein a reference multitone synchronization signal is used by said estimator and said refinement device in calculating a time offset and a frequency offset of said multitone synchronization signal, said receiver utilizing said time offset and said frequency offset to synchronize with said received QFDM signal, and
  wherein said initial time and frequency offset estimator comprises:
    a plurality of smoothed time-domain correlation estimators for outputting a series of time offset estimate and correlation estimate pairs, each pair related to a frequency offset estimate; and
    a selector for selecting a selected time offset estimate and a selected initial frequency offset based in part upon the selection of the frequency offset estimate and time offset estimate that corresponds with the largest value of correlation estimate.

2. The system of claim 1, wherein the initial time and frequency offset estimator uses a coarse frequency discretization using F candidate frequency offsets.

3. The system of claim 1, wherein said reference multitone synchronization signal has a length of T, and wherein said frequency offset estimate refinement device comprises:
  a T-length interval extractor for extracting a T-length sample of the output of said sampler;
  a numerical oscillator for generating a complex exponential of a candidate frequency offset;
  a multiplier for multiplying said T-length sample with said complex exponential to obtain a frequency shifted received signal;
  a correlator for correlating said frequency shifted received signal with said reference multitone synchronization signal and producing a correlation output; and
  a numerical optimizer for receiving said correlation output and outputting a new frequency offset candidate.

4. The system of claim 3, wherein said new frequency offset candidate and a time offset associated with said new frequency offset candidate are used by said receiver if said new frequency offset candidate is a candidate that yields a maximum correlation output.

5. The system of claim 1, wherein each of said smoothed time domain correlation estimators comprises:
  a time domain correlator;
  a smoothing filter connected to said time domain correlator and receiving an output from said time domain correlator; and
  a maximum detector connected to and receiving an output from said smoothing filter for detecting a signal energy maxima representing a time estimate at which the energy of said reference multitone synchronization signal is at a maximum.

6. A method of synchronizing an orthogonal frequency division multiplexing (OFDM) receiver with a received OFDM signal comprising a multitone synchronization signal, comprising the steps of:
  obtaining a coarse time offset estimate of said received signal;
  sampling said received signal in a selected time interval to derive samples of said multitone synchronization signal;
  analyzing said samples with respect to a reference multitone synchronization signal to obtain, for each sample analyzed, a time offset, a frequency offset, and a signal energy;
  selecting a one of said analyzed samples with the greatest signal energy to yield a selected time offset estimate and a selected frequency offset estimate for use by said receiver in synchronizing with said received OFDM signal; and
  using said selected time offset estimate and said selected frequency offset estimate to synchronize said receiver with said received OFDM signal.

7. A method of carrying out OFDM communications comprising:
  receiving an OFDM signal including within it a multitone synchronization signal;
  locating said synchronization signal within said OFDM signal;
  determining a time offset value of said synchronization signal;
  determining an initial frequency offset value of said synchronization signal; and
  recursively refining said frequency offset estimate to yield a selected pair of time and frequency offset values to be used by said OFDM receiver; and
  using said selected pair of time and frequency offset values to synchronize receiver operations with said received OFDM signal.

8. A method of carrying out OFDM communications comprising:
  receiving an OFDM signal including within it a multitone synchronization signal;
  locating said synchronization signal within said OFDM signal;
  determining a time offset value of said synchronization signal;
  determining an initial frequency offset value of said synchronizatioin signal;
  recursively refining said frequency offset estimate to yield a selected pair of time and frequency offset values to be used by said OFDM receiver; and
  wherein said initial time offset value and said initial frequency offset value are determined by obtaining a correlation with a stored reference value of said synchronization signal.

9. The method of claim 8, wherein said correlation is performed seeking a maximum received synchronization signal energy level.

10. An orthogonal frequency division multiplexing (OFDM) communication device, comprising:
  means for receiving an OFDM signal containing a multitone synchronization signal;
  means, coupled to said receiving means, for sampling a synchronization interval of said OFDM signal:
  means, connected to said sampling means and said receiving means, for obtaining an initial time estimate and an initial frequency offset estimate of said OFDM signal;
  means, connected to said receiving means, said sampling means and said estimating means, for obtaining a frequency offset estimate refinement;
  storage means, connected to said estimating means and said refinement means, for storing a reference multitone synchronization signal for use by said estimating means and said refinement means in calculating a time offset and a frequency offset of said multitone synchronization signal, said receiving means utilizing said time offset and said frequency offset to synchronize with said received OFDM signal;

a plurality of means for obtaining smoothed time-domain (TDC) correlation estimates, said smoothed TDC estimate means outputting a series of time offset estimate and correlation estimate pairs, each pair related to a frequency offset estimate; and means for selecting a selected time offset estimate and a selected initial frequency offset based in part upon the selection of the frequency offset estimate and time offset estimate that corresponds with the largest value of correlation estimate.

11. The system of claim 10, wherein each of said smoothed TDC estimate means comprises:

a time domain correlator;

a smoothing filter connected to said time domain correlator and receiving an output from said time domain correlator; and a maximum detector connected to and receiving an output from said smooching filter for detecting a signal energy maxima representing a time estimate at which the energy of said reference multitone synchronization signal is at a maximum.

12. The system of claim 11, wherein the estimating means uses a coarse frequency discretization using F candidate frequency offsets.

13. The system of claim 10, wherein said reference multitone synchronization signal has a length of T, and wherein said refinement means comprises:

a T-length interval extractor for extracting a T-length sample of the output of said sampler;

a numerical oscillator for generating a complex exponential of a candidate frequency offset;

a multiplier for multiplying said T-length sample with said complex exponential to obtain a frequency shifted received signal;

a correlator for correlating said frequency shifted received signal with said reference multitone synchronization signal and producing a correlation output; and a numerical optimizer for receiving said correlation output and outputting a new frequency offset candidate.

14. The system of claim 13, wherein said new frequency offset candidate and a time offset associated with said new frequency offset candidate are used by said receiving means if said new frequency offset candidate is a candidate that yields a maximum correlation output.

15. A device for synchronizing an orthogonal frequency division multiplexing (OFDM) receiver with a received OFDM signal comprising a multitone synchronization signal, comprising:

means for obtaining a coarse time offset estimate of said received signal;

means for sampling said received signal in a selected time interval to derive samples of said multitone synchronization signal;

means for analyzing said samples with respect to a reference multitone synchronization signal to obtain, for each sample analyzed, a time offset, a frequency offset; and a signal energy;

means for selecting one of said, analyzed samples with the greatest signal energy to yield a selected time offset estimate and a selected frequency offset estimate, wherein said selected time offset estimate and said selected frequency offset estimate are used by said receiver in synchronizing with said received OFDM signal; and means for passing said selected time offset estimate and said selected frequency offset estimate to said receiver for use by said receiver in synchronizing with said received OFDM signal.

16. A device for carrying out OFDM communications comprising:

means for receiving an OFDM signal including within it a multitone synchronization signal;

means for locating said synchronization signal within said OFDM signal;

means for determining a time offset value of said synchronization signal;

means for determining an initial frequency offset value of said synchronization signal; and means for recursively refining said frequency offset estimate to yield a selected pair of time and frequency offset values to be used by said OFDM receiver; and means for passing said selected time offset estimate and said selected frequency offset estimate to a receiver circuit for use by said receiver circuit in synchronizing with said received OFDM signal.

17. A device for carrying out OFDM communications comprising:

means for receiving an OFDM signal including within it a multitone synchronization signal;

means for locating said synchronization signal within said OFDM signal;

means for determining a time offset value of said synchronization signal;

means for determining an initial frequency offset value of said synchronization signal; and means for recursively refining said frequency offset estimate to yield a selected pair of time and frequency offset values to be used by said OFDM receiver; and wherein said initial time offset value and said initial frequency offset value are determined by obtaining a correlation with a stored reference value of said synchronization signal.

18. The device of claim 17, wherein said correlation is performed seeking a maximum received synchronization signal energy level.

19. An OFDM signal processor comprising:

an OFDM receiver for receiving an OFDM signal containing a multitone synchronization signal;

a synchronization interval sampler connected to said input and said receiver;

an initial time and frequency offset estimator connected to said sampler and said receiver; and a frequency offset estimate refinement device connected to said receiver, said sampler and said estimator, wherein a reference multitone synchronization signal is used by said estimator and said refinement device in calculating a time offset and a frequency offset of said multitone synchronization signal, said receiver utilizing said time offset and said frequency offset to synchronize with said received OFDM signal, and wherein said initial time and frequency offset estimator comprises:

a plurality of smoothed time-domain correlation estimators for outputting a series of time offset estimate and correlation estimate pairs, each pair related to a frequency offset estimate; and a selector for selecting a selected time offset estimate and a selected initial frequency offset based in part upon the selection of the frequency offset estimate and time offset estimate that corresponds with the largest value of correlation estimate.

20. The processor of claim 19, wherein each of said smoothed time domain correlation estimators comprises:
a time domain correlator;
a smoothing filter connected to said time domain correlator and receiving an output from said time domain correlator; and
a maximum detector connected to and receiving an output from said smoothing filter for detecting a signal energy maxima representing a time estimate at which the energy of said reference multitone synchronization signal is at a maximum.

21. The processor of claim 19, wherein the initial time and frequency offset estimator uses a coarse frequency discretization using F candidate frequency offsets.

22. The processor of claim 19, wherein said reference multitone synchronization signal has a length of T, and wherein said frequency offset estimate refinement device comprises:
a T-length interval extractor for extracting a T-length sample of the output of said sampler;
a numerical oscillator for generating a complex exponential of a candidate frequency offset;
a multiplier for multiplying said T-length sample with said complex exponential to obtain a frequency shifted received signal;
a correlator for correlating said frequency shifted received signal with said reference multitone synchronization signal and producing a correlation output; and
a numerical optimizer for receiving said correlation output and outputting a new frequency offset candidate.

23. The processor of claim 22, wherein said new frequency offset candidate and a time offset associated with said new frequency offset candidate are used by said receiver if said new frequency offset candidate is a candidate that yields a maximum correlation output.

24. The processor of claim 22, wherein said initial time and frequency offset estimator comprises:
a first Fast Fourier Transformer for obtaining a transform of said received signal;
an second Fast Fourier Transformer device for obtaining a transform of said reference multitone synchronization signal;
a frequency domain correlation estimator for receiving said received signal transform and said reference signal transform and outputting an initial frequency offset estimate; and
a time domain correlation estimator for receiving said received signal transform and said reference signal transform and said initial frequency offset estimate and outputting a time offset estimate.

25. An OFDM transmitter comprising:
means for transmitting an OFDM signal comprising a first time interval and a second time interval, each of the first and second time intervals including at least one OFDM symbol transmission time period, the first and second time intervals recurring on a periodic basis;
means for transmitting data on a plurality frequencies during said first time interval; and
means for transmitting, during said second time interval, a plurality of synchronization tones in parallel on different non-adjacent, frequencies, said second time interval being a predetermined time period, the frequencies of said synchronization tones in said second time interval being distinct from said frequencies used to transmit data in the first time interval, the first time interval immediately preceding the second time interval.

26. A method for transmitting an OFDM signal comprising the steps of:
transmitting an OFDM signal during a first time interval, the first time interval including at least one OFDM symbol transmission time period, said step of transmitting data during the first time interval including transmitting data on a plurality of data frequencies; and
transmitting an OFDM signal during a second time interval which includes at least one OFDM tone, said first and second time intervals being consecutive time intervals,
transmitting during said second time interval including transmitting a plurality of synchronization tones at a plurality of non-adjacent synchronization frequencies for a predetermined time period, the frequencies of said synchronization tones being distinct from said data frequencies used in the first time interval.

27. The method of claim 25,
wherein the first and second time intervals are single OFDM symbol transmission time periods; and
wherein frequencies used for synchronization tones in a symbol transmission time period are not used in any immediately consecutive symbol transmission time period for synchronization tones.

28. The method of claim 26,
wherein the first and second time intervals are single OFDM symbol transmission time periods; and
wherein at least three frequencies are used for synchronization tones during each symbol transmission time period.

* * * * *

UNITED STATES PATENT AND TRADEMARK OFFICE
CERTIFICATE OF CORRECTION

| | | |
|---|---|---|
| PATENT NO. | : 7,027,429 B2 | |
| APPLICATION NO. | : 09/884581 | |
| DATED | : April 11, 2006 | |
| INVENTOR(S) | : Rajiv Laroia et al. | |

It is certified that error appears in the above-identified patent and that said Letters Patent is hereby corrected as shown below:

Column 9, Claim 1, line 17 should read: --chronize with said received OFDM signal, and...--.

Column 10, Claim 6, line 10 should read: --selecting one sample of said analyzed sample with the greatest...--.

Column 10, Claim 8, line 43 should read: --synchronization signal;--.

Signed and Sealed this

Third Day of July, 2007

JON W. DUDAS
*Director of the United States Patent and Trademark Office*